(No Model.)
J. MOORE.
SINK, &c., MADE OF CEMENT.
No. 413,861. Patented Oct. 29, 1889.
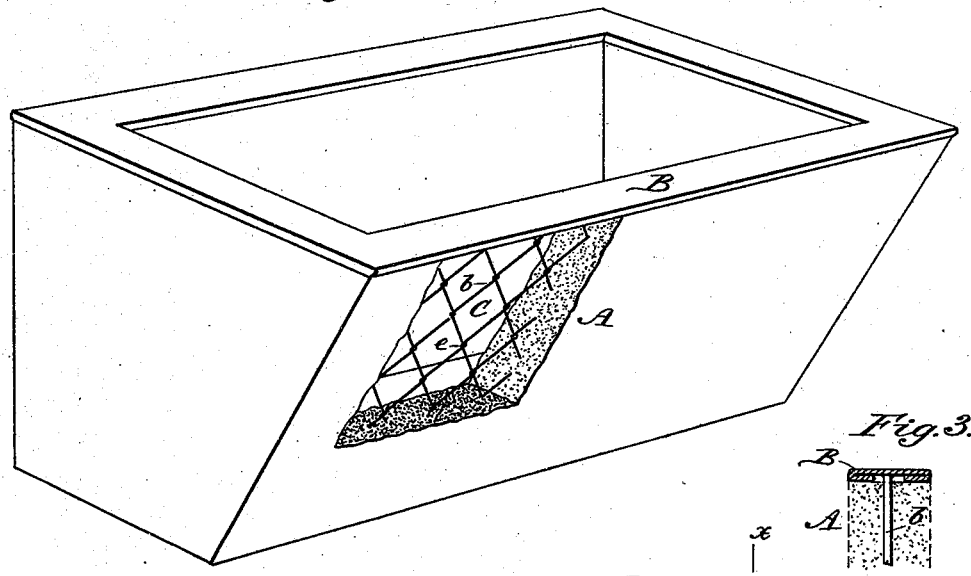
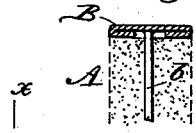
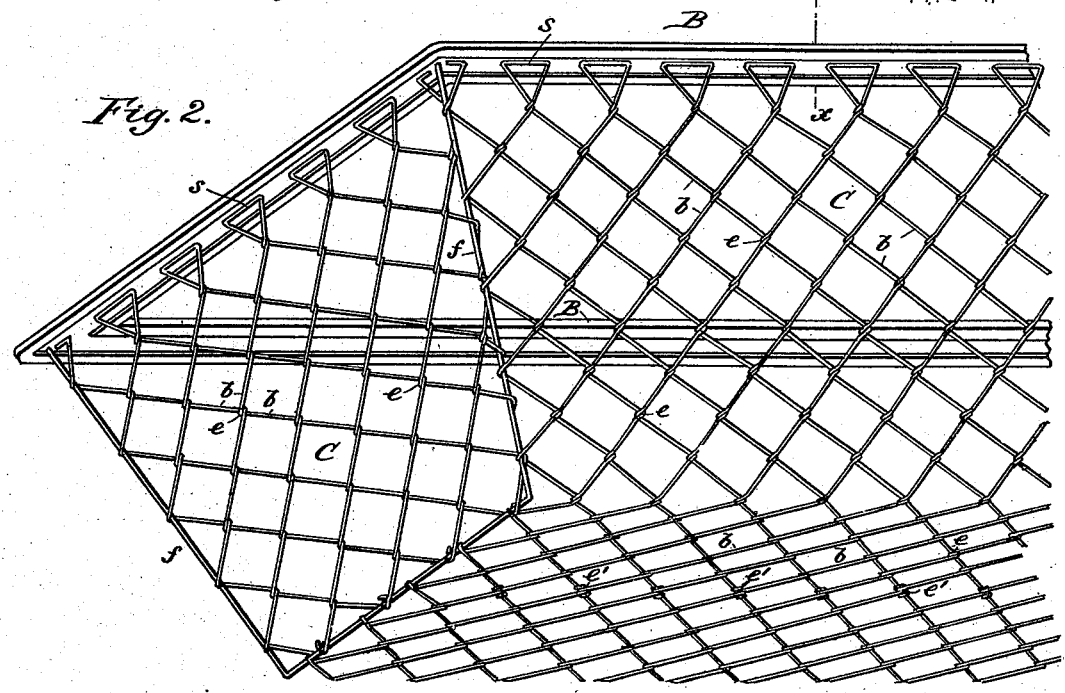
WITNESSES:
D. C. Reusch.
C. Sedgwick
INVENTOR:
J. Moore
BY
Munn & Co.
ATTORNEYS.

UNITED STATES PATENT OFFICE.

JOHN MOORE, OF EAST NEW DURHAM, ASSIGNOR TO HIMSELF, ALPHONSE THOUROT, OF UNION, AND JOHN DARLING, OF WEST NEW YORK, NEW JERSEY.

SINK, &c., MADE OF CEMENT.

SPECIFICATION forming part of Letters Patent No. 413,861, dated October 29, 1889.

Application filed September 16, 1889. Serial No. 324,005. (No model.)

*To all whom it may concern:*

Be it known that I, JOHN MOORE, of East New Durham, in the county of Hudson and State of New Jersey, have invented a new and useful Improvement in Wash-Tubs, Sinks, and other Vessels made of Cement, &c., of which the following is a full, clear, and exact description.

This invention relates to wash-tubs, sinks, and other vessels made of cement and cement compositions and having a frame-work of metal strips and woven wires, said wires being embedded in the cement of which the body of the vessel is composed to give strength and durability to the whole structure.

The invention consists in a novel construction of a vessel of this description, substantially as hereinafter shown and described, and more particularly pointed out in the claims, and in which the metal skeleton or frame is composed of a continuous metal cap-strip, arranged to form an outside protector to the rim or top of the vessel to keep the cement from being chipped, and of an interwoven wire-netting embedded within the cement and serving to anchor the metal cap-strip to its place as well as to stiffen and strengthen the vessel generally, the wires of the netting where crossing each other being twisted around or otherwise interlocked with one another, whereby increased strength and durability are secured and the entire frame is compactly held together for the running of the cement about the wires.

Reference is to be had to the accompanying drawings, forming a part of this specification, in which similar letters of reference indicate corresponding parts in all the figures.

Figure 1 represents a view in perspective of a wash-tub embodying my invention, a portion of the cement on its near side being broken away to illustrate the embedded wire net-work. Fig. 2 is a view in perspective of the metallic frame or skeleton in part as viewed from beneath, the offside of the wire portions of said frame being omitted to prevent confusion. Fig. 3 is a transverse section upon the line $x$ $x$ in Fig. 2 through the one side of the cap-plate.

A indicates the cement body of a wash-tub, and B C its metal frame. The portion B of this frame is constructed to form a continuous cap-strip, which is not designed to be embedded in the cement of the vessel, but to lie exterior thereto on the top or what may be termed the "rim" of the vessel to protect the cement body and to prevent it from being chipped or injured. This cap-strip is shown as made of a flat strip of pliable metal bent or doubled under on its opposite edges to give additional strength and to present a good edge finish. The wire net-work C portion of the frame is mainly composed of interwoven or crossing wires $b$, fixedly united at their tops $s$, by solder or otherwise, to the metal cap-strip B, and made to interlock with one another where crossing each other by doubling or twisting them around one another as shown at $e$, and around a wire $f$ at each end of the frame, bent to give the necessary shape or configuration to said end. All these wires $b$ and $f$ constitute the net-work of the frame, designed to be embedded in the cement of the body of the vessel. The wires $b$ on opposite sides of the vessel I construct in two separate lengths, which are permanently soldered or fastened at their upper ends to the cap-strip B on opposite sides of the intended vessel and then united below or at the bottom of the frame by doubling or twisting them around one another, as shown at $e'$, as by this construction I am better enabled to give the frame its required shape than if each side wire $b$ were a continuous one.

The frame B C, constructed, as described, with the upper ends of the wires $b$ permanently secured to the cap-strip and doubled or twisted around each other where crossing one another, will make a particularly strong one, compact and convenient for handling without getting out of shape. Such frame is then placed in a suitable mold to receive the cement or cement composition of the body A of the vessel, in a plastic state, around or about and through the wire net-work C of the frame, so as to embed the same therein, but leaving the cap-strip B exposed on and around the upper marginal surface or rim of the vessel, to protect said rim and to prevent chipping of the cement after it has set. The skeleton frame C, having its wires interlocked where crossing one another, as described, and fixedly secured at their upper ends to the cap-strip B, will make the cement tub or vessel an exceedingly strong and durable one.

The same construction will be carried out in sinks and other chambers or vessels of different shapes made of cement or cement composition, as has herein been described for a wash-tub.

Having thus described my invention, what I claim as new, and desire to secure by Letters Patent, is—

1. In wash-tubs, sinks, and other vessels made of cement or cement composition, the combination, with the cement body of the vessel, of a metallic frame composed of an outer or exposed metal cap-strip exterior to the cement and extending over or around the top or rim of said body, and a wire-netting fixedly united above to said cap-strip and embedded within the cement throughout the sides, ends, and bottom of the vessel, substantially as specified.

2. The combination, with the cement body A of the vessel, of the exposed unembedded metal cap-strip B on the top or rim of said body, and the wire-netting C, embedded within the cement throughout the sides, ends, and bottom of the vessel, and composed of interwoven wires $b$, fixedly united at their upper ends with the cap-strip and connected with each other where crossing one another, essentially as and for the purposes herein set forth.

3. The combination, with the cement body A of the vessel, of the exposed continuous upper metal cap-strip B, exterior to the cement, and the wire-netting C, composed of interwoven wires $b$, fixedly united at their upper ends with the cap-strip and connected with each other where crossing one another, as at $e$, also where meeting below, as at $e'$, and the end wires $f$ of the frame, said wires $b$ and $f$ all being united with each other and being embedded within the cement of the body throughout the sides, ends, and bottom of the vessel, substantially as shown and described.

JOHN MOORE.

Witnesses:
 A. GREGORY,
 C. SEDGWICK.